Nov. 18, 1924.                                          1,516,266
                        H. S. DICKINSON
           COMBINED HAND AND POWER STEERING DEVICE FOR TRACTORS
                    Filed Nov. 1, 1920        4 Sheets-Sheet 4

INVENTOR
                                         Harry S. Dickinson
                                              ATTORNEY Patented Nov. 18, 1924.

1,516,266

UNITED STATES PATENT OFFICE.

HARRY S. DICKINSON, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

COMBINED HAND AND POWER STEERING DEVICE FOR TRACTORS.

Application filed November 1, 1920. Serial No. 420,870.

*To all whom it may concern:*

Be it known that I, HARRY S. DICKINSON, a citizen of the United States, residing at Moline, county of Rock Island, State of Illinois, have invented certain new and useful Improvements in Combined Hand and Power Steering Devices for Tractors, of which the following is a specification.

The invention relates to tractors particularly those which are propelled by two forward drive wheels.

It is particularly concerned with an improved means for steering tractors of this type and for utilizing the power of the tractor for driving the mechanisms of the devices that are drawn.

One of the objects of the invention is to provide a combined hand and power steering control for a tractor.

Another object is to provide a mechanism in a front wheel drive tractor for utilizing the power of the tractor to drive the mechanism of the devices drawn.

Other objects and advantages of the invention will appear from the specifications and drawings.

An embodiment of the invention is illustrated in the accompanying drawings in which, Figure 1 is a side view of the tractor.

Figure 1:
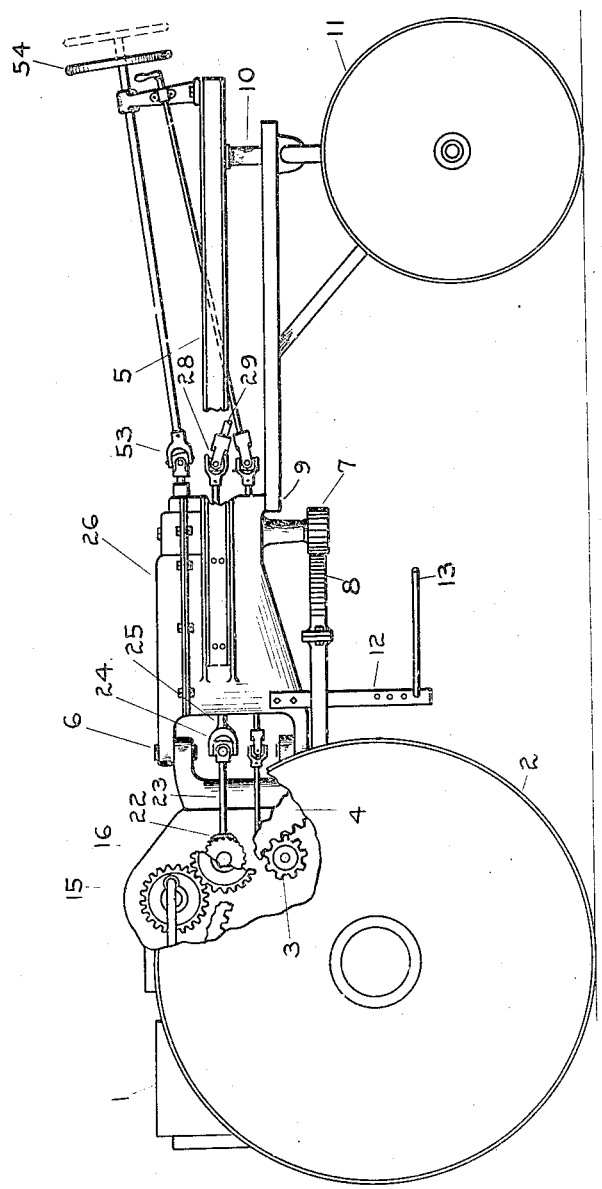
Figure 2:
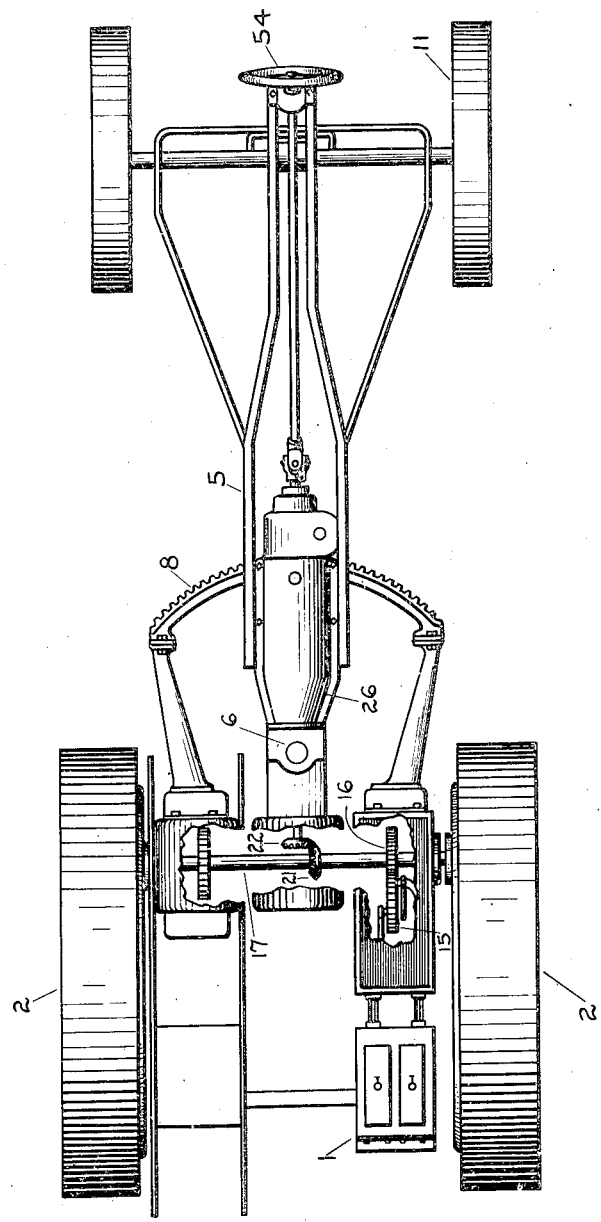
Figure 2 is a plan view.

The tractor includes a power plant comprising an engine 1, which in this case, is a small steam engine. This power plant together with associated mechanism for driving the tractor is supported by two forward drive wheels 2 driven through the medium of pinions 3 meshing with the bull gears 4 carried by the drive wheels. A steering and coupling frame 5 is pivoted at 6 to the tractor to swing about a substantially vertical axis. The frame carries a steering pinion 7 cooperating with a steering sector 8 on the tractor. Rotation of the steering pinion serves to move the tractor relative to the steering frame for steering purposes. This frame is also arranged to be connected to a wide variety of devices to be drawn and for this purpose is provided with brackets 9 and 10 which may be pivotally connected to the various drawn devices. In the construction shown, a truck 11 is illustrated as connected to the coupling frame.

The connection of the steering frame to a drawn device serves to stabilize the tractor, and in some cases, to transmit the draft, as for example, when the tractor is connected to a high draft implement such as a corn cultivator. When, however, the tractor is connected to a low draft implement such as a plow, the draft is transmitted from a draft bar 12 through the medium of a connecting link 13 whose length is proportioned so that the draft is taken by the link and not through the connecting frame 5. The connection is such that the drawn device is free to tilt relative to the tractor about a substantially longitudinal, horizontal axis so as to adjust itself to inequalities in the surface of the ground.

Figure 5:
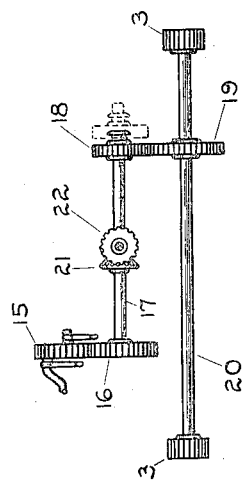
Figure 5 is a plan view showing the arrangement of the driving gears for the power shaft.

It has heretofore been the practice to operate the mechanisms of the drawn devices by means of power derived from the carrying wheels of the drawn device. When such drawn device is pulled by a tractor, there is available for use in driving the mechanism, the power of the tractor. Means is provided in the tractor illustrated herewith for utilizing this power. The engine drives a gear 15 (see Fig. 5) meshing with gear 16 carried by jack shaft 17. This shaft carries a sliding gear 18 arranged to be thrown into and out of contact with a gear 19 on shaft 20 carrying the tractor driving pinions 3. Jack shaft 17 also carries a bevel gear 21 meshing with a bevel gear 22 carried by a shaft 23 connected by a universal joint 24 to a shaft 25 mounted in bearings in a housing portion 26 of the steering frame 5. The rear end 27 of this shaft carries a universal joint 28 and a shaft extension 29 which may be connected to the mechanism of the drawn device. It will be observed that by means of this construction, the rearwardly extending power shaft is constantly driven whenever the tractor motor is running because the connection of such shaft is independent of the starting and stopping of the driving mechanism of the tractor. The provision of the universal joint 24 permits the power to be transmitted to the coupling and steering frame without interference by reason of the various positions that such frame may assume relative to the tractor. The frame provides a support for the rearwardly extending shaft although it will be understood that the shaft might otherwise be supported and be independent of the movements of the steering frame.

Mounted in suitable bearings in the housing 26 of the steering frame is an electrical generator 30 driven from the power shaft 25 by means of gears 31 and 32. This generator is rotated whenever the tractor motor is in operation and its power may be utilized for lighting, ignition and other purposes. The mounting of the generator in this position avoids the necessity for providing space for it near the engine, removes it from the jar and vibration of the engine, and at the same time it is mounted so that it will be constantly driven whenever the tractor motor is in operation. It is furthermore, readily accessible and well protected.

Figure 4:
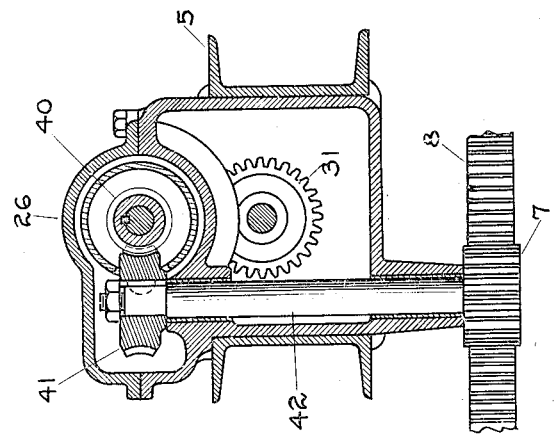
Figure 4 is a section on the line 4—4 of Figure 3.

The steering mechanism may be operated either by hand or by power and the mechanism for achieving this result is as follows:

The shaft on which the generator 30 is mounted is connected to a bevel gear 33 meshing with the pinion 34 which in turn meshes with a second bevel gear 35 mounted in a bearing in the frame. The bevel gears 33 and 35 carry clutch members 36 and 37 respectively with which cooperates a cone clutch 38 carried by a slideable shaft 39. This shaft is slideably keyed to a worm 40 meshing with the worm wheel 41 (see Fig. 4) driving a shaft 42 which rotates the steering pinion 7 meshing with the steering sector 8. It will be understood that when the clutch member 38 is in engagement with one of the clutch faces carried by one of the bevel gears, the shaft and the steering pinion will be rotated in one direction and when the clutch member is in contact with the other clutch member carried by the other bevel gear, the shaft and steering pinion will be rotated in the opposite direction.

The clutch member 38 is normally maintained in its middle or neutral position by means of a spring 43 which tends to bias it to the right against the action of a spring 44 tending to bias it to the left. These two springs neutralize each other and maintain the member in the position shown in Figure 3. The member may be moved, however, in either direction, to effect a steering action, by a screw threaded sleeve 45 which when rotated in one direction, presses against the collar 46 on slideable shaft 39 and when rotated in the other direction, presses the sleeve 47 against the head 48 and moves the slideable shaft 39 in the opposite direction. The threaded sleeve is rotated by means of a shaft 50 having a clutch head 51 cooperating with the interior clutch face 52 in a threaded sleeve 45. Shaft 50 is connected through the universal joint 53 with a steering wheel 54 slideably and rotatably mounted in a bracket at the rear of the steering frame. When the head 51 is pulled rearwardly or to the left by moving the steering wheel to the dotted line position shown in Figure 1, the head contacts the interior clutch face 52 and rotation of the steering wheel and of the shaft 50 will force the sleeve 45 and the shaft 39 either forward or backward in the direction desired to thereby operate the steering clutch mechanism to utilize the power of the tractor for steering. It is only necessary to turn the handwheel slightly to secure a proper steering action. The clutch member 38 is forced and held in engagement with either the member 36 or 37 against the action of either spring 44 or 43 so that a slight movement in the direction to disengage the clutch gives immediate results. The friction clutch permits the steering to be graduated in the manner desired. The operator steers to the right by turning the handwheel to the right or to the left by turning the handwheel to the left.

Figure 3:
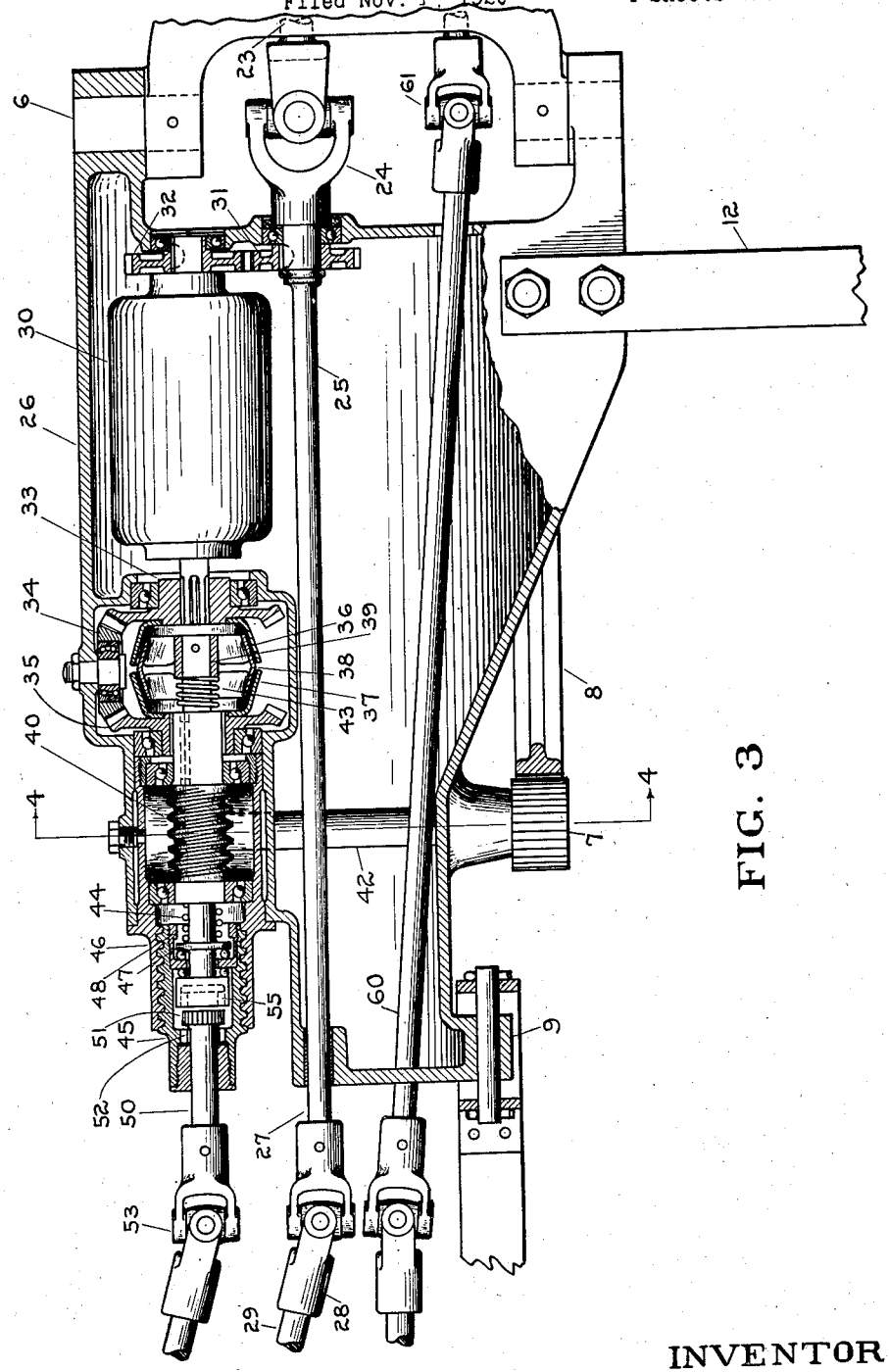
Figure 3 is a section showing the steering mechanism in detail.

The tractor is steered by hand by pushing the hand-wheel forward to the full line position shown in Figure 1 so as to slide the head 51 out of engagement with the clutch face 52 and into engagement with the interior clutch face 55 in the head 48 on shaft 39. Rotation of shaft 50 by hand will thereby be communicated directly to the shaft 39 and the worm 40 and cooperating mechanism to the steering sector. The friction clutch of the power steering mechanism will be held in neutral position during this operation by the springs 43 and 44. It is impossible to operate the power steering mechanism during the hand steering operation because a forward push on the shaft 50 cannot transmit any sliding motion to the shaft 39 because of the arrangement of the bearings as illustrated in Figure 3.

Controls for the tractor may be operated by one or more shafts 60, carried by the steering frame and having universal joints 61 in substantial alignment with the pivot of the steering frame to the tractor.

The structure shown is for purposes of illustration and may be modified without departing from the spirit and scope of the invention as defined by the claims.

What I claim is:

1. A front wheel drive tractor having a power plant, propulsion mechanism including two forward drive wheels, a coupling frame pivoted to the tractor to swing about a substantially vertical axis for steering purposes, a steering mechanism carried by the coupling frame, means for controlling the steering mechanism operable from a position at the rear of the coupling frame, power transmitting means extending from the tractor to the coupling frame, said power transmitting means being flexible in substantial alignment with the pivot of the coupling frame to the tractor and being supported by the coupling frame, connections between the power transmitting means and the steering mechanism to operate the latter by power, and means for connecting the power transmitting means to various devices to be drawn to operate the mechanisms of said devices by the power of the tractor.

2. A tractor having a power plant, propulsion mechanism including two forward drive wheels, a coupling and steering frame pivoted to the tractor to swing about a substantially vertical axis, steering mechanism carried by the frame and cooperating with the tractor so that the frame and tractor may be swung relative to one another for steering purposes, means for transmitting power from the tractor to the steering frame including connections for operating the steering mechanism by power, and controlling means operated by a single controlling member for manipulating the steering mechanism manually and for controlling the application of power to the steering mechanism.

3. A tractor having a power plant, propulsion mechanism including two forward drive wheels, a coupling and steering frame pivoted to the tractor to swing about a substantially vertical axis, an electric generator mounted on and carried by said frame, steering mechanism mounted on said frame, and a power shaft extending from the tractor to the coupling frame, said power shaft having portions adapted to be connected to the mechanism of devices to be drawn to operate said mechanism and having connections associated with it for driving the generator and the steering mechanism.

4. A tractor having a power plant, propulsion mechanism including two forward drive wheels, a coupling frame, an electrical generator carried by said frame, and means for transmitting power from the propulsion mechanism to the generator.

5. A tractor having a power plant, propulsion mechanism including two forward drive wheels, a coupling frame pivoted to the tractor to swing about a vertical axis, an electrical generator carried by said frame, and means for transmitting power from the propulsion mechanism to the generator.

6. A tractor having a power plant, propulsion mechanism including two forward drive wheels, a coupling frame pivoted to the tractor to swing about a substantially vertical axis, an electrical generator carried by and housed within said frame, and a power shaft extending rearwardly from the tractor to the coupling frame and connected with the generator, said shaft having a flexible connection in substantial alignment with the pivot of the coupling frame.

7. A tractor having a power plant, propulsion mechanism including two forward drive wheels, a coupling frame pivoted to the tractor to swing about a substantially vertical axis, steering mechanism carried by and partially housed by a portion of the coupling frame, an electrical generator carried by and housed by the coupling frame, and a power shaft extending from the tractor to the coupling frame and arranged to drive the generator and to operate the steering mechanism, said shaft having a flexible connection in substantial alignment with the pivot of the coupling frame to the tractor.

In testimony whereof, I affix my signature.

HARRY S. DICKINSON.